United States Patent [19]
Dudley

[11] Patent Number: 5,095,715
[45] Date of Patent: Mar. 17, 1992

[54] ELECTRIC POWER DEMAND LIMIT FOR VARIABLE SPEED HEAT PUMPS AND INTEGRATED WATER HEATING HEAT PUMPS

[75] Inventor: Kevin F. Dudley, Cazenovia, N.Y.

[73] Assignee: Electric Power Research Institute, Inc., Palo Alto, Calif.

[21] Appl. No.: 585,385

[22] Filed: Sep. 20, 1990

[51] Int. Cl.$^5$ ............................................. F25B 1/00
[52] U.S. Cl. ...................................... 62/228.4; 62/230; 237/2 B
[58] Field of Search ............... 237/2 B; 62/230, 231, 62/228.1, 228.4; 307/35, 30, 36, 37, 38, 39

[56] References Cited

U.S. PATENT DOCUMENTS

| | | | |
|---|---|---|---|
| 4,656,835 | 4/1987 | Kidder et al. | 62/175 |
| 4,727,727 | 3/1988 | Reedy | 62/238.6 |
| 4,734,628 | 3/1988 | Bench et al. | 318/309 |
| 4,738,118 | 4/1988 | Kanazawa | 62/215 |
| 4,766,734 | 8/1988 | Dudley | 62/160 |
| 5,036,676 | 8/1991 | Dudley | 62/230 X |

Primary Examiner—Henry A. Bennet
Attorney, Agent, or Firm—Wall and Roehrig

[57] ABSTRACT

An integrated heat pump and hot water system provides heating or cooling of a comfort zone, as required, and also provides water heating. As a power management feature, the speed of a variable speed compressor is reduced to a predetermined fraction, e.g. 80%, of its normal operating speed, in response to a demand limit signal provided from the electric power utility during times of peak electrical load. A reference compressor speed is computed based on the current compressor speed, indoor temperature, outdoor temperature, and zero-load temperature difference. If the system is between operating cycles when the demand limit signal is received, a stored speed is used which corresponds to the compressor speed at a predetermined outdoor-indoor temperature difference. This system produces graceful reduction in comfort cooling during demand limit periods.

12 Claims, 2 Drawing Sheets

ELECTRIC POWER DEMAND LIMIT FOR VARIABLE SPEED HEAT PUMPS AND INTEGRATED WATER HEATING HEAT PUMPS

BACKGROUND OF THE INVENTION

This invention is directed to commercial or residential heat pump systems that provide heating or cooling of a comfort zone, as required, and which can also provide water heating. The invention is more particularly directed towards an improved electrical power management system in which the power draw from individual heat pump systems can be reduced gracefully during times of peak electrical demand, in response to a utility demand limit signal furnished from the electric power utility to its electrical customers.

Integrated heat pumps are often employed to provide heating or cooling, as needed, to a residential or commercial comfort zone, i.e., the interior of a residence, office complex, hospital, or the like. Integrated heat pumps can also be employed to heat water. A heat pump system for air conditioning, comfort zone heating, and water heating is described in U.S. Pat. No. 4,766,734. Systems of this type can have a number of modes of operation, such as air conditioning alone, space heating alone, water heating alone, air conditioning with water heating, and comfort zone heating with water heating. Additional modes, such as a defrost cycle can also be employed. For comfort zone heating and water heating, resistive elements are employed as auxiliary heating elements for use at times when the heat pump alone cannot produce sufficient heating of the comfort zone or produce enough hot water in the water heater.

During times of regional temperature extremes, especially during warm summer months, the electrical demand for a given power utility may approach the maximum electrical capacity of the utility. If demand is left unchecked, the total power draw for a community could exceed the capacity of the utility to provide electrical power. During times of peak customer loading, the utility must take steps to reduce customer demand, otherwise power blackouts or brownouts can occur, which can be accompanied by catastrophic loss of power to regions of the electrical utility's service area.

One approach that has been proposed to address this problem is for the utility to supply a demand limit signal to its customers whenever the power demand exceeds threshold value. When the utility supplies the demand limit signal, the customer's air conditioning equipment is cycled off and on periodically and at staggered intervals to reduce the total current draw from the customer base. That is, for the customers that receive the demand limit signal, the air conditioning compressor motors, for example, may be turned off automatically, and then automatically restarted at some later time. This reduces the number of compressors operating at any one time, and thus reduces the total current draw that has to be supplied by the electrical utility.

This system has some merit from the utilities' standpoint, but has a number of drawbacks from the customers' standpoint. The residence or commercial building air conditioning system, being simply turned either off or on depending on the state of the demand limit signal, can produce wide swings in temperature from the off interval to the on interval. Also, the homeowner or building manager can tend to "anticipate" a peak-period demand limit, and reduce the temperature in the building prior to the time of intermittent operation. This produces an even greater load than normal in times when a power shortage may be possible. Also, the reduced temperature set point will cause a greater electrical load (with accompanying large temperature swings) during times when the utility does institute the demand limit.

Thus, a system has been sought which would produce a more graceful reduction in air conditioning performance at times of peak electrical power loading, and some means have been desired to prevent customers from defeating the demand limit by simply reducing the thermostat set point.

OBJECTS AND SUMMARY OF THE INVENTION

It is an object of the present invention to improve integrated heat pump systems, with a feature that is not provided in the prior art.

It is a further object of the present invention to provide a method of operating an integrated heat pump and hot water system that gracefully reduces cooling, water heating, or space heating performance as a means to reduce overall customer demand for electrical power.

A still further object of the present invention is to provide an automatic technique for graceful performance reduction of the heat pump and hot water system which cannot be defeated simply by reducing the temperature set point for a cooling cycle.

In accordance with an aspect of this invention, these and other objects are attained in an integrated heat pump and hot water system that is capable of providing heating or cooling to an environmental comfort zone. The heat pump and hot water system includes a variable speed compressor whose operating speed is substantially linearly related to the heating or cooling load, i.e., to the difference between outdoor air temperature and indoor air temperature within the comfort zone. The heat pump and hot water system also includes a receiver device or similar apparatus to receive a utility peak demand limit signal, e.g., as transmitted by a public utility, to initiate automatic power limiting and thus to reduce the power demand imposed by the heat pump and hot water system during times of peak loading to the power utility. In keeping with this invention, sensors provide a controller unit with the outdoor temperature $T_{OD}$ and the indoor temperature $T_{ID}$ i.e., the temperature within the comfort zone. The speed $S_1$ of the variable speed compressor is also sensed and stored in the controller. When the peak demand limit signal is received, the controller computes a reference speed $S_R$ for the compressor as a function of the speed $S_1$, the outdoor temperature $T_{OD}$, the indoor temperature $T_{ID}$ and predetermined values that correspond to a reference indoor temperature $R^{IR}$ and a zero-load temperature $\Delta T_Z$ that corresponds to the difference between the outdoor and indoor temperatures which result in a zero-load requirement on the compressor. In a practical system, the reference indoor temperature could be 78° F. and the zero-load temperature difference $\Delta T_Z$ could be −13° F.,(−7.2° C.). The latter being a negative value simply means that because of heat generated by personnel and power-consuming equipment within the building, at least some cooling would be needed to bring the indoor temperature down to 78° F. unless the outdoor temperature is 65° F. or below.

With the reference speed $S_R$ having been calculated, the controller limits the operating speed of the variable speed compressor to a predetermined fraction of the reference speed for example, 80% $S_R$. In the embodiment described, the reference speed $S_R$ is calculated according to the relationship:

$$S_R = S_1 \times \frac{(T_{OD} - T_R - \Delta T_Z)}{(T_{OD} - T_{ID} - \Delta T_Z)}$$

During times in which the demand limit is imposed, the auxiliary resistive water heating element is also disabled, so that water heating only comes from the water heat exchanger that is located on the discharge or pressure side of the compressor.

In the event that the demand limit signal is imposed during a time when the compressor is off, i.e., following an operating cycle or between operating cycles, a stored operating speed $S_P$ is used to compute the reference speed $S_R$. In this case, the stored operating speed $S_P$ represents the compressor speed at a time during a cycle when the compressor had most recently run at a given load, i.e., when the temperature difference between the outdoor and indoor temperature $T_{OD} - T_{ID}$ equaled some predetermined difference $\Delta T_R$, such as 5° F. (2.8° C.). Then, the reference speed $S_R$ can be computed based on the stored operating speed $S_P$, the reference temperature $\Delta T_R$ e.g., 5°, the indoor temperature $T_{ID}$, the outdoor temperature $T_{OD}$, and the zero-load temperature $\Delta T_Z$. In the embodiment disclosed, the reference speed $S_R$ can be calculated according to the relationship:

$$S_R = \frac{(T_{OD} - T_{ID} - \Delta T_Z)}{(\Delta T_R - \Delta T_Z)} \times S_P$$

If the demand limit signal is received during a heating cycle, the system will simply reduce the thermostat set point some predetermined amount, e.g., 5° F., and disable the auxiliary resistive heater for water heating.

The above and many other objects, features and advantages of this invention will become apparent from the ensuing description of a preferred embodiment, which should be read in connection with the accompanying Drawing.

DETAILED DESCRIPTION OF THE PREFERRED EMBODIMENT

Figure 1:
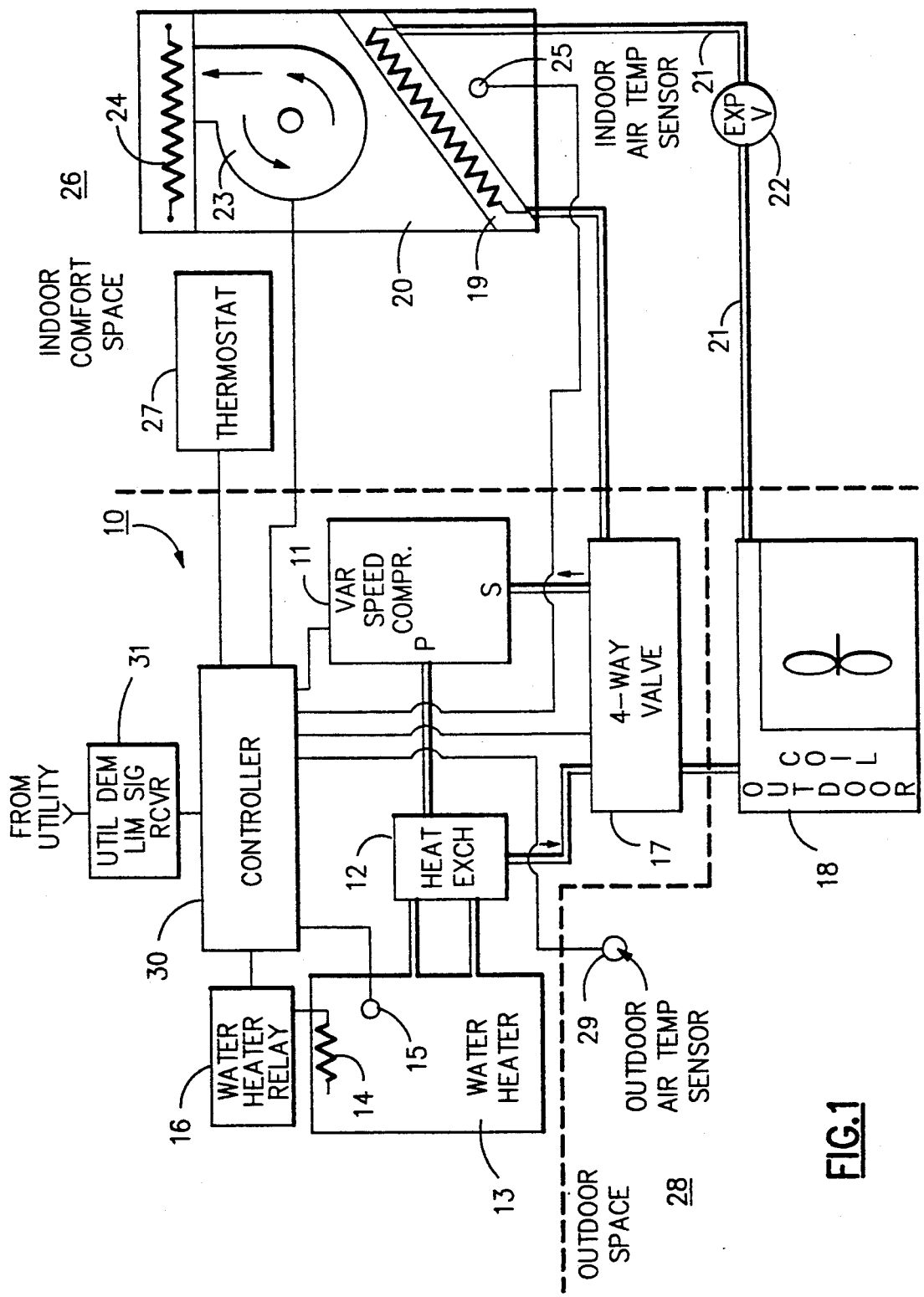
FIG. 1 is a diagrammatic representation of an integrated heat pump and hot water system which operates according to the principles of the present invention.

Referring now to the Drawing, and initially to FIG. 1, an integrated heat pump and hot water system 10 provides air conditioning and heating to an indoor comfort zone, and also provides hot water. In this system 10, a variable speed compressor 11 receives a low pressure refrigerant gas at a suction inlet S and discharges the refrigerant gas at high pressure from a discharge or pressure port P. The compressed refrigerant flows to a desuperheating heat exchanger 12 for heating water in a hot water tank 13. The tank has an auxiliary resistive heater 14 and a temperature sensor 15. A water heater relay 16 selectively enables or disables the auxiliary heating element 14.

From the heat exchanger 12, the compressed refrigerant gas flows to a four-way valve 17 that is coupled through appropriate piping to an outdoor heat exchanger coil 18, and to an indoor coil 19 that is enclosed within an indoor heat exchanger 20. The coils 18 and 19 are also coupled to each other by piping 21 in which there is located an expansion valve 22 of any suitable design. Also within the indoor heat exchanger 28 is a variable speed fan 23, an auxiliary resistive heating element 24 on a discharge side of the fan 23, and a return air temperature sensor 25 on an intake side of the coil 19. The indoor heat exchanger 20 is located within an indoor comfort space 26, i.e., a home or office, and a thermostat 27 is also disposed within the indoor comfort space 26. The outdoor coil 18 is located in an outdoor space 28 in which is also located an outdoor air temperature sensor 29.

A controller 30 is formed of a microprocessor having a memory storage capability and which is microprogrammable to control the variable speed compressor 11, the variable speed fan 23, the water heater relay 16, and the four-way valve 17. The controller also has inputs connected to the water heater temperature sensor 15, the outdoor air temperature sensor 29, the return air temperature sensor 25, and the thermostat 27. The controller is also coupled to receive a utility demand limit signal (DLS) from a receiver device 31. The nature of the device 31 depends on the system employed by the public utility. The signal can be transmitted to the customer in a number of ways, i.e., over a dedicated FM radio, telephone lines, TV or video cable, or over the power lines. The output of the receiver can be quite simple, e.g., a high to indicate the presence of the signal DLS, and a low to indicate the absence thereof. The utility load demand limit signal could also simply be the output of a timer, e.g., the signal DLS could be provided at some predetermined interval each day, i.e. 10 a.m.–4 p.m., when a peak load is assumed.

The four-way valve 17 can assume heating or cooling configurations by establishing the sequence in which the compressed vapor flows through the two coils 18 and 19. For heating, the compressed refrigerant gas flows first to the indoor coil 19, which serves as a condenser. Condensed refrigerant liquid then flows through the piping 21 and from the expansion valve 22 into the outdoor coil 18 which serves as an evaporator. The low pressure gases then return through the four-way valve 17 to the suction inlet S of the compressor 11. For cooling of the comfort space 26, the four-way valve furnishes the compressed refrigerant gas first to the outdoor coil 18, which serves as a condenser, and then through the piping 21 and expansion valve 22 to the indoor coil 19. Then the low pressure refrigerant gas from the coil 19 is supplied through the four-way valve 17 to the suction inlet S of the compressor 11. The water heat exchanger 12 is operative in either the heating or cooling mode to heat the water in the tank 13.

For normal operation, i.e., during off-peak periods, the controller 30 operates the compressor 11 at an operating speed $S_1$ that produces heating or cooling corresponding to a heating load that depends on ambient conditions. Normally, the heating or cooling load is linearly related to the temperature difference $\Delta T$ between the outdoor temperature $T_{OD}$ and the indoor temperature $T_{ID}$ inside the indoor comfort space 26. That is, the temperature difference $-T = T_{OD} - T_{ID}$.

Figure 2:
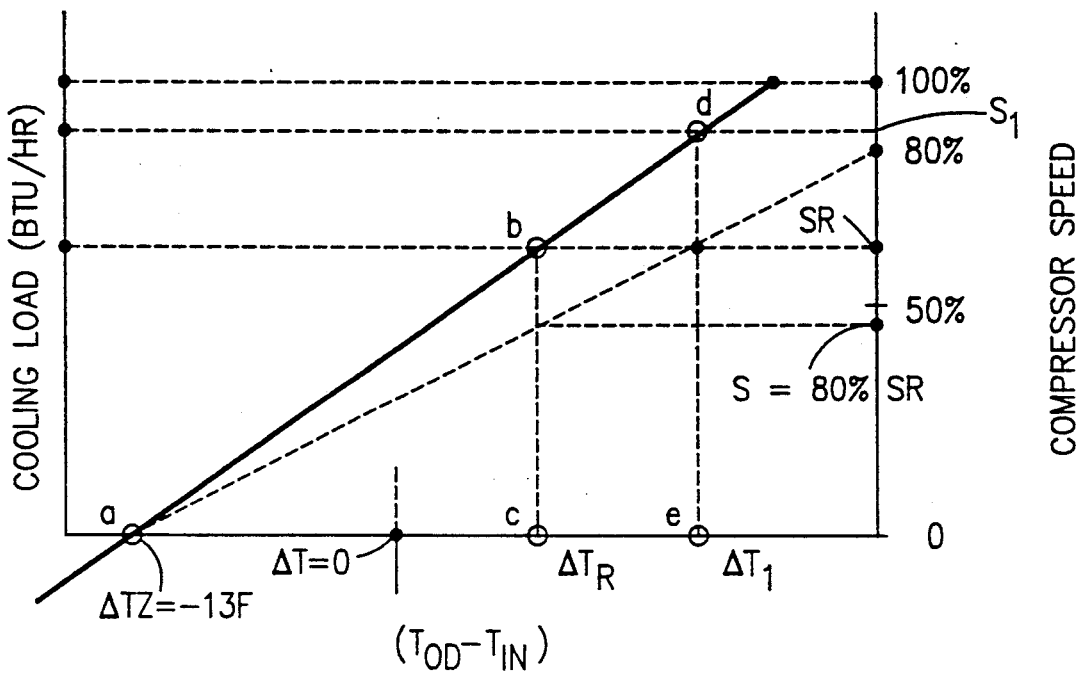
FIGS. 2 and 3 are charts of compressor speed vs. outdoor-indoor temperature difference, for explaining the operating principles of the present invention.

As shown in FIG. 2, at a given temperature difference there is a zero-load on the compressor. That is, at a given zero-load temperature $\Delta T_Z$, the load line crosses the abscissa. For this example, it is assumed that the zero-load temperature difference $\Delta T_Z = -13°$ F., that is, there is a zero-load on the compressor when the outdoor temperature $T_{OD}$ is 13° F. cooler than the indoor temperature $T_{ID}$. As mentioned before, this zero-load temperature difference represents heat given off by personnel and equipment in the comfort space.

During cooling, refrigerant gas from the pressure port P of the compressor 11 flows through the heat exchanger 12, four-way valve 17, outdoor coil 18, expansion valve 22, indoor coil 19, then through the four-way valve and back to the suction inlet S of the compressor 11. The speed of the compressor is adjusted to match the demand required. To maintain a given temperature difference $\Delta T$, the compressor 11 operates at a compressor speed $S_1$ located on the diagonal slope of FIG. 2.

In the event that the receiver 31 receives the demand limit signal DLS from the utility during a time that the compressor 11 is operating, the controller 30 institutes a demand limit mode, and immediately signals the water heater relay 16 to disable the resistive heating element 14. The controller 30 also reduces the compressor speed to a predetermined fraction of its previous operating speed, i.e, to a new speed $S' = 80\% \ S_1$. However, there may be a tendency of a resident, homeowner, or building manager to "beat the system" and establish a temperature less than 78° or other recommended temperature, prior to the time of the anticipated peak load. In such a case, the controller 30 is operative to set the operating speed at 80% of a reference speed, with the reference speed being the speed that the compressor 11 would have been operating if the thermostat 27 had been set at the normal temperature i.e., 78° F. Thus, at the time that the demand limit is instituted, and while the compressor is operating, the actual compressor speed $S_1$ the outdoor temperature $T_{OD}$ is measured by the sensor 29, and indoor or return air temperature $T_{ID}$ is measured by the return air temperature sensor 25, and these temperatures $T_{OD}$ and $T_{ID}$, are supplied to the controller 30. The controller also assumes a predetermined value for the zero-load temperature difference $\Delta T_Z$ e.g., $-13°$ F., as mentioned previously.

From the linear operating characteristic as shown in FIG. 2, the slope of the characteristic can be established from the triangle ade, the length ad is simply $\Delta T_1 - \Delta T_Z$, where $\Delta T_1$ is simply the difference between the outdoor temperature $T_{OD}$ and the indoor temperature $T_{ID}$. The length de is the compressor operating speed $S_1$.

If a standard or reference indoor temperature $T_R$ is assumed, such that $T_R = 78°$ F., then a reference temperature difference $\Delta T_R$ can be calculated as the difference between the outdoor temperature and the reference temperature or $\Delta T_R = R_{OD} - T_R$. Point c can be established at $\Delta T_R$ on the chart of FIG. 2, from which a point b can be projected on the compressor operating characteristic. This yields a reference speed $S_R$. The length bc corresponds to the reference speed $S_R$.

The length bc of triangle abc is simply the speed $S_R$ and the length ac equals $\Delta T_R - \Delta T_Z$. Because the triangles abc and ade are similar triangles, the corresponding sides will be in proportion, so that $S_R/S_1$ simply equals $(\Delta T_R - \Delta T_Z)/(\Delta T_1 - \Delta T_Z)$. Thus, the reference speed $S_R$ for the compressor then becomes the operating speed $S_1 \times$ a factor that depends on the above temperature relations, that is, $$S_R = \frac{S_1 \times (T_{OD} - T_R - \Delta T_Z)}{T_{OD} - T_{ID} - \Delta T_Z}$$

The operating speed is then established at 80% $S_R$.

If the demand limit signal is received when the compressor 11 is not operating, then a reference speed $S_R$ must be computed based on some previous operating conditions. Under those conditions, the compressor speed $S_1$ from a previous cooling cycle is stored corresponding to some predetermined temperature difference $\Delta T_1$ that occurred during the previous operating cycle. For example, during a cooling cycle, between the beginning and end of the operating cycle it can be assumed that there will be some point at which the difference between the outdoor temperature and indoor temperature equals, for example, five degrees F. For example, this occurs when the indoor temperature equals 78° F. and the outdoor temperature equals 83° F.

Figure 3:
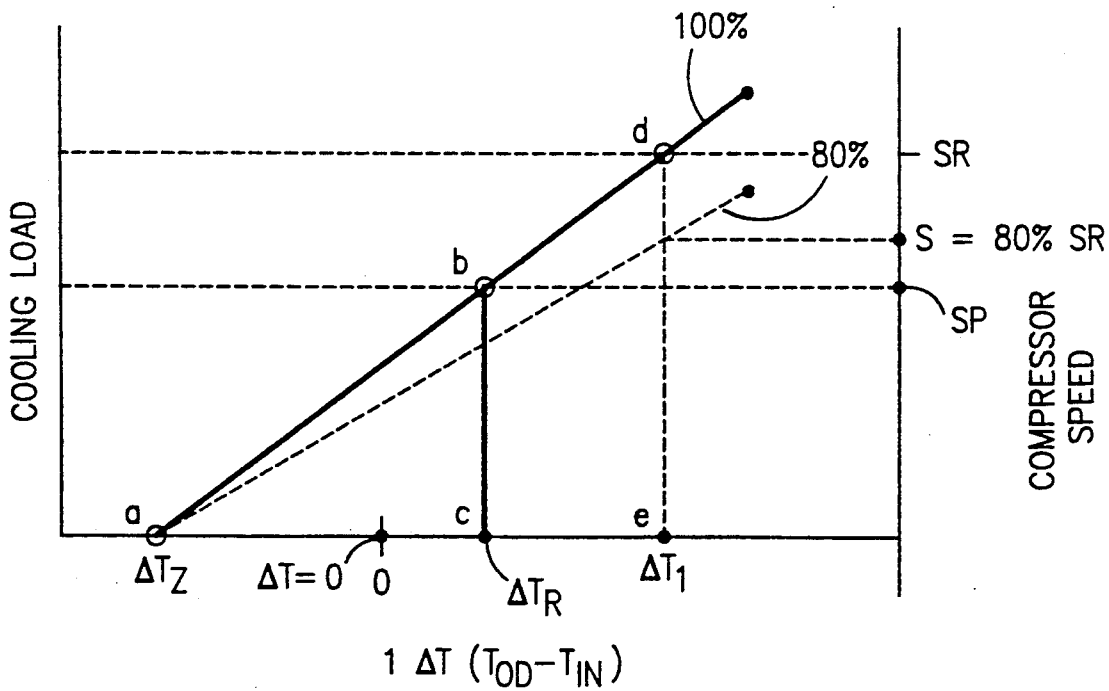

The controller 30, with stored values of $\Delta T_R$ (equals 5° F.), $\Delta T_Z$ (equals $-13°$ F.), and the stored operating speed $S_P$, can establish a reference speed $S_R$ as shown in FIG. 3. Here, for a given $\Delta T_1 = T_{OD} - T_{ID}$, similar triangles abc and ade occur on the linear operating characteristic chart. The leg ac has a length $\Delta T_R - \Delta T_Z$, and the leg ae has a length $\Delta T_1 - \Delta T_Z$. The legs bc and de have corresponding lengths equal to the $S_P$ and $S_R$. As the legs de and dc are in proportion to the legs ae and ac, the reference speed $S_R$ is simply expressed as $$S_R = \frac{(\Delta T_1 - \Delta T_Z) \times S_P}{(\Delta T_R - \Delta T_Z)}$$

This can also be expressed $$S_R = \frac{(T_{OD} - T_{ID} - T_Z) \times S_P}{\Delta T_R - \Delta T_Z}$$

In this example, the reference speed $S_R$ can be expressed:

$$S_R = \frac{(T_{OD} - 78 + 13) \times S_P}{(5 + 13)} = \frac{(T_{OD} - 65) \times S_P}{18}$$

In either event, during a cooling cycle, the temperature in the indoor comfort space 26 will tend to rise gradually about five degrees F over a six-hour peak period, i.e., from about 78° F. to about 83° F. Meanwhile, the system 10 continues to remove humidity from the air so that the comfort factor in the space 26 is significantly better than if the compressor 11 were simply operated intermittently. Also, because the variable speed compressor 11 has its speed reduced by 20%, rather than being simply cycled on and off, the compressor operates at a more efficient speed, and avoids high-draw start up current that is characteristic of the more conventional on and off cycling of the prior art.

If the demand limit signal (DLS) is received during a heating cycle, the controller 30 automatically sets back the heating demand by about 5°, and signals the relay 16 to disable the auxiliary water heater element 14. In the case of commercial space, the auxiliary space heater element 24 can also be disabled.

The efficiency of the variable speed compressor 11 increases as its operating speed S' is reduced. Also, the power requirement is related to the square of the compressor speed. Therefore, with the measures taken according to this invention, the power requirement for the heat pump and hot water system 10 is reduced to about 60-65% of the power required for full operation. This permits a significant reduction in electrical power consumption during peak periods without significant customer discomfort. The utility can send a simple closure signal to all of the customers, so there is no need to stagger the on and off cycling operation to the various customers at any one time. Instead, all the customers would continue to operate, but at a reduced load. With this invention, the higher efficiency of a variable speed compressor is utilized to achieve further operating economies.

While this invention has been described in detail with reference to a preferred embodiment, it should be understood that the invention is not limited to that precise embodiment. Rather, many modifications and variations would present themselves to those skilled in the art without departing from the scope and spirit of this invention, as defined in the appended claims.

What is claimed is:

1. Method of operating an integrated heat pump and hot water system that is capable of providing heating or cooling to an environmental comfort zone, said heat pump and hot water system including a variable speed compressor whose operating speed is substantially linearly related to the difference between outdoor air temperature and indoor air temperature in the comfort zone, and also including means to receive a utility peak demand limit signal to initiate automatic power limiting to reduce the power demand imposed by the heat pump and hot water system, the method comprising sensing the outdoor temperature $T_{OD}$; sensing the indoor temperature $T_{ID}$ in the comfort zone; sensing the speed $S_1$ of the variable speed compressor; and in response to receiving said utility peak demand limit signal DLS calculating a reference speed $S_R$ for the compressor as a function of said speed $S_1$, said outdoor temperature $T_{OD}$, said indoor temperature $T_{ID}$, and predetermined values that correspond to a reference indoor temperature $T_{ID}$ and a zero-load temperature difference $\Delta T_Z$ that corresponds to the difference between the outdoor and indoor temperatures that result in a zero load requirement on said compressor; and during occurrence of said signal DLS operating the compressor at a reduced operating speed limited to a predetermined fraction, less than unity, times said reference speed $S_R$.

2. Method of operating a heat pump and hot water system according to claim 1 wherein said reference speed $S_R$ is calculated according to the relationship:

$$S_R = S_1 \times \frac{(T_{OD} - T_R - \Delta T_Z)}{(T_{OD} - T_{ID} - \Delta T_Z)}.$$

3. Method of operating a heat pump and hot water system according to claim 2, wherein said zero-load temperature difference $\Delta T_Z$ is on the order of $-13$ degrees F. ($-7.2°$ C.).

4. Method of operating a heat pump and hot water system according to claim 1 wherein the system also comprises a water heater having a heat pump water exchanger following said compressor and an auxiliary resistive water heating element, the method further comprising disabling said auxiliary resistive water heating element in response to said utility peak demand limit signal.

5. Method of operating a heat pump and hot water system according to claim 1 further comprising storing an operating speed $S_P$ representing the compressor speed at a time during a cycle when the compressor had most recently run for use when said utility peak demand limit signal is received while the compressor is not running; storing a reference temperature difference $\Delta T_R$ representing the difference between the indoor temperature and the outdoor temperature at a time during the cycle when the compressor had most recently run, and computing said reference speed $S_R$ based on the stored operating speed $S_P$, the reference temperature difference $\Delta T_R$, said indoor temperature $T_{ID}$, said outdoor temperature $T_{OD}$, and said zero-load temperature difference $\Delta T_Z$.

6. Method of operating a heat pump and hot water system according to claim 5 wherein said reference speed $S_R$ is calculated according to the relationship:

$$S_R = \frac{(T_{OD} - T_{ID} - \Delta T_Z)}{(\Delta T_R - \Delta T_Z)} \times S_P.$$

7. Method of operating a heat pump and hot water system according to claim 6 wherein said zero-load temperature difference $\Delta T_Z$ is on the order of $-13$ degrees F. ($7.2°$ C.).

8. Method of operating a heat pump and hot water system according to claim 5 wherein said operating speed $S_P$ is obtained at the time during said operating cycle when said outdoor temperature equals a predetermined temperature.

9. Method of operating a heat pump and hot water system according to claim 5 wherein said operating speed $S_P$ is obtained at the time during said operating cycle when the difference between said outdoor temperature and said indoor temperature equals said reference temperature difference $\Delta T_R$.

10. Method of operating a heat pump system that is capable of providing heating or cooling to an environmental comfort zone wherein said heat pump system includes a variable speed compressor whose operating speed is controlled to vary with an imposed heat transfer load on the system; controller means providing a speed control signal to the compressor to control its speed, the speed control signal being supplied under normal conditions at a normal speed value to operate the compressor at a normal condition speed; and demand limit signal receiver means coupled to the controller means to receive a demand limit signal to initiate power limiting the method comprising supplying said speed control signal at said normal speed value when said demand limit signal is not being received by said receiver means; and supplying said speed control signal at a reduced value below said normal speed value when said demand limit signal is being received.

11. The method of claim 10 wherein said reduced value is a predetermined fraction times the normal speed value.

12. The method of claim 10 wherein said compressor is operated at a speed that is substantially proportional to said heat transfer load.

* * * * *